United States Patent [19]

Fortune

[11] Patent Number: 5,333,105
[45] Date of Patent: Jul. 26, 1994

[54] TRANSIENT VOLTAGE PROTECTOR

[75] Inventor: G. Clark Fortune, Farmington Hills, Mich.

[73] Assignee: Eaton Corporation, Cleveland, Ohio

[21] Appl. No.: 68,531

[22] Filed: May 27, 1993

[51] Int. Cl.5 .................. H02H 7/122; H02H 9/00
[52] U.S. Cl. ................................. 363/56; 361/56; 361/111
[58] Field of Search ............. 363/55, 56; 361/56, 361/86, 89, 91, 111

[56] References Cited

U.S. PATENT DOCUMENTS

| | | | |
|---|---|---|---|
| 4,008,418 | 2/1977 | Murphy | 361/18 |
| 4,134,101 | 1/1979 | Jones, Jr. | 361/111 |
| 4,916,572 | 4/1990 | Guajardo | 361/56 |
| 5,189,587 | 2/1993 | Haun et al. | 361/56 |
| 5,223,795 | 6/1993 | Blades | 324/536 |

Primary Examiner—Emanuel T. Voeltz
Assistant Examiner—Matthew Nguyen
Attorney, Agent, or Firm—Tarolli, Sundheim & Covell

[57] ABSTRACT

An approved apparatus is provided to protect an electrical device in a vehicle against transient changes in voltage provided by a power source. The transient voltage protector is connected with a conductor which conducts current from the power source to the electrical device. The transient voltage protector responds to the rate of change of voltage in the conductor to shunt at least a portion of the electrical current in the conductor away from the electrical device when the rate of change of voltage in the conductor exceeds a predetermined rate. The transient voltage protector includes a high pass filter which provides an output signal when the rate of change of voltage in the conductor exceeds a predetermined rate. In response to the output from the high pass filter, a combined comparator and shunt controller effects operation of a shunt switch from an open condition to a closed condition. This completes a path through which current is directed away from the electrical device.

3 Claims, 1 Drawing Sheet

TRANSIENT VOLTAGE PROTECTOR

BACKGROUND OF THE INVENTION

The present invention relates to a new and improved apparatus for use in a vehicle to protect an electrical device against transient changes in voltage from a power source disposed in the vehicle.

During operation of a vehicle, such as an automobile or truck, relatively large transient voltages may occur. These transient voltages are of relatively short duration, less than 0.5 seconds, and may result from a loose battery connection or other causes. When electrical devices on the vehicle are exposed to the relatively large transient voltages, the devices could be damaged.

In the past, fixed voltage varistors have been used in vehicles to protect electrical devices against relatively large voltages. When the voltage being conducted to an electrical device becomes excessive, the resistance of the varistor drops and the excessive current is shunted away from the protected device. A varistor responds to changes in the absolute magnitude of the voltage from the vehicle power source. Therefore, if the magnitude of the voltage remained below a threshold voltage, a rate of change of voltage could occur without causing the varistor to shunt current away from the protected device.

Since the varistor responds to a predetermined voltage, the varistors provided in association with electrical devices in a vehicle must have characteristics which correspond to the normal magnitude of the voltage provided by the vehicle power source. Thus, a varistor used with a vehicle having a 12 volt power source must have characteristics which are different from the characteristics of a varistor used with a vehicle having a 24 volt power source. The use of different varistors for electrical devices used with different vehicles complicates the providing of electrical devices for vehicles having different power sources.

SUMMARY OF THE INVENTION

The present invention relates to an apparatus which is used in a vehicle to protect one or more electrical devices against transient changes in voltage provided by a power source within the vehicle. The apparatus includes a transient voltage protector which is responsive to the rate of change of voltage in a conductor through which electrical energy is conducted to the protected electrical device. When the rate of change of voltage in the conductor exceeds a predetermined rate of change, the transient voltage protector shunts a portion of the electrical current in the conductor away from the protected electrical device.

In one embodiment of the invention, the transient voltage protector includes a high pass filter which provides an output signal when the rate of change of the voltage in the conductor exceeds a predetermined rate. In this embodiment of the invention, a comparator effects operation of a shunt switch from an open condition to a closed condition when the output signal from the high pass filter indicates that the rate of change of the voltage in the conductor has exceeded a predetermined rate. Operating the shunt switch from the open condition to the closed condition directs current away from the protected electrical device.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
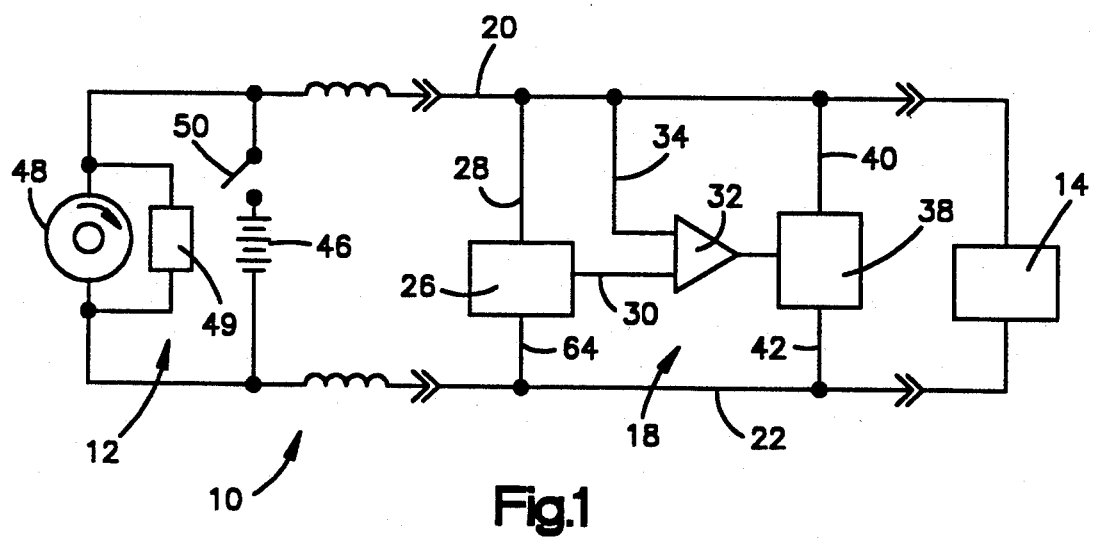
FIG. 1 is a schematic illustration depicting the manner in which a transient voltage protector constructed in accordance with the present invention is connected with a circuit in a vehicle.

An electrical circuit 10 which is used in a vehicle includes a power source 12 which supplies electrical energy to a device 14. Although the electrical device 14 has been illustrated in FIG. 1 as being only a single unit, it should be understood that a plurality of units could be connected with the power source 12. A transient voltage protector 18, constructed in accordance with the present invention, is connected between power source 12 and the electrical device 14.

The transient voltage protector 18 responds to the rate of change of voltage in a main conductor 20. The main conductor 20 conducts electrical energy from the power source 12 to the electrical device 14. When the rate of change of voltage in the main conductor 20 exceeds a predetermined rate of change, the transient voltage protector 18 shunts at least a portion of the current in the main conductor 20 to a return conductor 22. The return conductor 22 is connected between the electrical device 14 and the power source 12.

In the embodiment of the invention illustrated in FIG. 1, the transient voltage protector 18 includes a high pass filter 26. The high pass filter 26 has an input line 28 connected with the main conductor 20 and an output line 30 connected with a combined comparator and shunt controller 32. When the rate of change of the voltage in the main conductor 20 exceeds a predetermined rate, the high pass filter 26 provides an output voltage over the line 30 to the comparator and shunt controller 32. When the voltage in the output line 30 from the high pass filter 26 exceeds a predetermined function of the voltage conducted to the comparator and shunt controller 32 through a line 34, the output signal from the comparator and shunt controller changes from low to high.

When the output signal from the comparator and shunt controller 32 goes high, a shunt switch 38 in the transient voltage protector 18, is operated from an open condition to a closed condition. When the shunt switch 38 is in the open condition, it is ineffective to conduct electrical current from the main conductor 20 to the return conductor 22. However, when the shunt switch 38 is operated to the closed condition in response to the output from the comparator and shunt controller 32 changing from low to high, the shunt switch 38 enables current to flow from the main conductor 20 through lines 40 and 42 to the return conductor 22. By directing current from the main conductor 20 to the return conductor 22 through the shunt switch 38, at least a portion of the electrical current in the main conductor 20 is directed away from the electrical device 14. Therefore, the transient increase in the voltage in the main conductor 20 is not conducted to the electrical device 14.

The transient increase in voltage from the power source 12 will decay in a relatively short time so that the voltage in the main conductor returns to a nominal or steady-state voltage level. The high pass filter 26 is designed to maintain the output signal on the line 30 for a length of time which is substantially greater than the length of time for which a transient voltage is maintained in the main conductor 20. Thus, the output of high pass filter 26 is assured to be present during the entire transient. Rectifier 61 provides a rapid discharge path for condenser (capacitor) 60 after the voltage on main conductor 20 returns to its normal level. This assures that the high pass filter 26 provides an output signal on the line 30 for only the duration of the transient. Of course, these specific time periods may be different for different circuits.

In the embodiment of the invention illustrated in FIG. 1, the power source 12 includes a battery 46 which is charged by an alternator 48 in a well known manner during operation of a motor of the vehicle. A voltage regulator 49 is connected with the alternator 48.

In the schematic illustration of FIG. 1, a loose battery connection 50 has been illustrated as being the cause of a transient increase in the voltage of the main conductor 20. Thus, when the connection 50 initially becomes loose at a terminal of the battery 46, the load on alternator 48 will be removed. As the voltage regulator 49 cannot instantaneously reduce the control current in the alternator 48, the output voltage present on main conductor 20 will be a relatively large transient voltage of short duration.

The transient voltage protector 18 responds to the rapid rise in the voltage in the main conductor 20 by closing the shunt switch 38 to protect the electrical device 14. After the transient voltage has passed, the shunt switch 38 is opened. Although the transient voltage in the conductor 20 has been illustrated schematically in FIG. 1 as being caused by a loose battery connection 50, the transient voltage could be induced by other causes.

Figure 2:
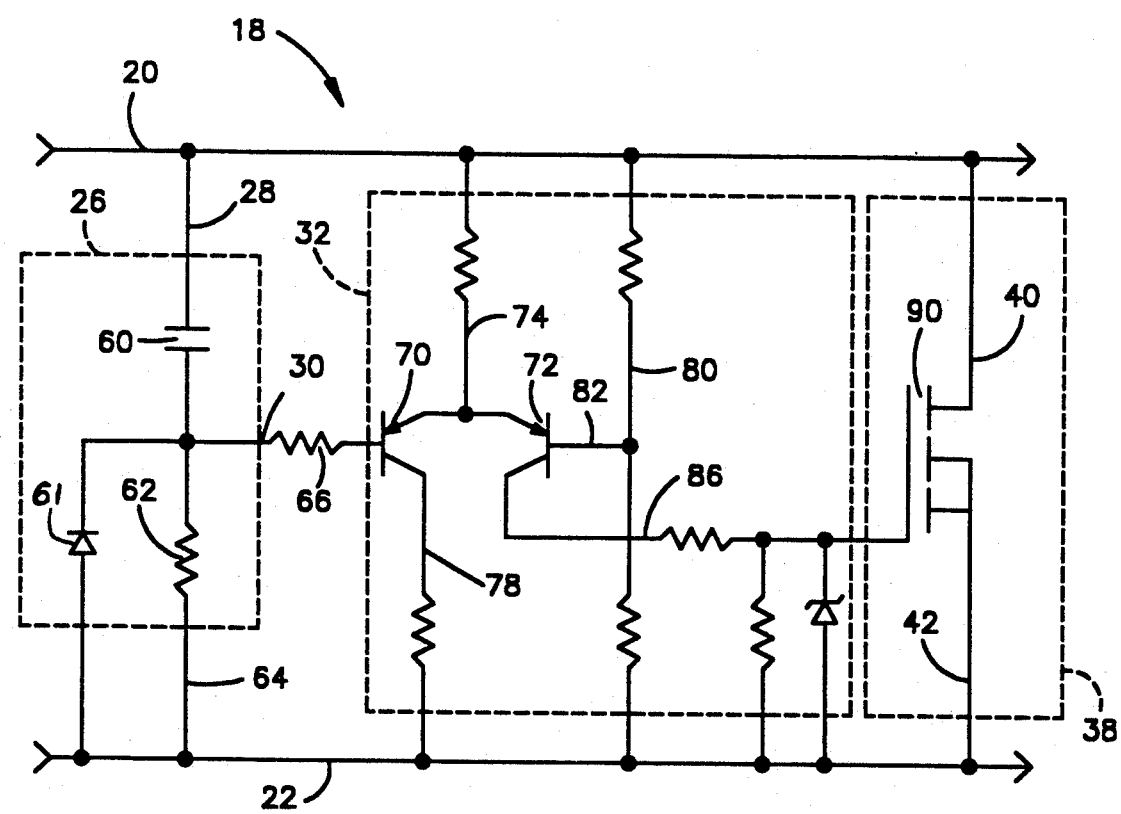
FIG. 2 is a more detailed schematic illustration of the transient voltage protector of FIG. 1.

It is contemplated that many different types of circuits could be constructed in such a manner as to respond to a transient increase in the voltage in the main conductor 20 to protect the electrical device 14 against exposure to a transient voltage. One specific embodiment of the transient voltage protector 18 is illustrated in FIG. 2.

The high pass filter 26 includes a capacitor 60 (FIG. 2) which is connected with the main conductor 20 by the input line 28. The capacitor 60 is connected with the return conductor 22 through a resistor 62 and line 64. A side of the capacitor 60 opposite from the input line 28 is connected with the combined comparator and shunt controller 32 through the output line 30 and a resistor 66. The comparator and shunt controller 32 includes first and second PNP transistors 70 and 72 having emitters connected with the main conductor 20 through a line 74.

When there is a normal steady-state voltage in the main conductor 20, there is no output from the high pass filter 26. At this time, the first transistor 70 conducts electrical current from the lead 74 to a lead 78 connected with the return conductor 22. The second transistor 72 is biased to a nonconducting condition by voltage conducted from the main conductor 20 over leads 80 and 82 to the base of the second transistor. Therefore, during conducting of a steady-state voltage through the main conductor 20, there is no output from the second transistor 72.

The collector of the second transistor 72 is connected with the shunt switch 38 by a lead 86. The shunt switch 38 includes a field effect transistor 90 which remains in an open or nonconducting condition until there is an output from the second transistor 72. It should be noted that the two leads 74 and 80 have been shown as a single lead 34 in the schematic illustration of FIG. 1.

When there is a transient increase in the voltage in the main conductor 20, the high frequency transient voltage increase is transmitted through the capacitor 60 and lead 30 to the base of the first transistor 70. At this time, the base of the second transistor 72 is exposed to a lower voltage than the base of the first transistor 70. Therefore, current is conducted from the lead 74 through the second transistor 72. Conduction of current through lead 74 and its resistance reverse biases the base of transistor 70, rendering it nonconducting.

The current from the second transistor 72 is conducted through the line 86 to the field effect transistor 90. Voltage applied to the gate of the field effect transistor 90 renders the field effect transistor conducting. When the field effect transistor 90 is conducting, the transient energy increase is shunted from the main conductor 20 through the lines 40 and 42 to the return conductor 22. This protects the electrical device 14 (FIG. 1) from the transient voltage increase.

The decay time for the capacitor 60 is approximately twice as long as the maximum length of the time for which a transient voltage increase will be maintained in the main conductor 20. Therefore, after the transient energy increase in the main conductor 20 has been dissipated, the output from the high pass filter 28 will be reduced to zero and the first transistor 70 will again be rendered conducting. This interrupts the output signal being transmitted over the lead 86 to the field effect transistor 90 in the shunt switch 38. Interruption of the output signal conducted to the field effect transistor 90 over the lead 86 results in the field effect transistor 90 changing from a conducting condition to a nonconducting condition.

In view of the foregoing description, it is apparent that the present invention provides an apparatus 10 which is used in a vehicle to protect one or more electrical devices 14 against transient changes in voltage provided by a power source 12 within the vehicle. The apparatus 10 includes a transient voltage protector 18 which is responsive to the rate of change of voltage in a conductor 20 through which electrical energy is conducted to the protected electrical device 14. When the rate of change of voltage in the conductor 20 exceeds a predetermined rate of change, the transient voltage protector 18 shunts a portion of the electrical current in the conductor 20 away from the protected electrical device 14.

In one embodiment of the invention, the transient voltage protector 18 includes a high pass filter 26 which provides an output signal when the rate of change of the voltage of the conductor 20 exceeds a predetermined rate. In this embodiment of the invention, a combined comparator and shunt controller 32 effects operation of a shunt switch 38 from an open condition to a closed condition when the output signal from the high pass filter 26 indicates that the rate of change of the voltage in the conductor 20 has exceeded a predetermined rate. Operating the shunt switch 38 from the open condition to the closed condition directs current away from the protected electrical device 14.

Having described the invention, the following is claimed:

1. An apparatus for use in a vehicle to protect an electrical device against transient changes in voltage provided by a power source disposed in the vehicle, said apparatus comprising a conductor for conducting electrical current from the power source to the electrical device, and load protector means responsive to the rate of change of voltage in said conductor for decreasing the electrical current in said conductor when the rate of change of voltage in said conductor exceeds a predetermined rate of change, said load protector means including transient voltage responsive means for providing an output voltage which varies as a function of the rate of change of voltage in said conductor, a comparator for comparing an output voltage from said transient voltage responsive means to the voltage in said conductor and for providing an output signal when the output voltage from said transient voltage responsive means is a predetermined function of the voltage in said conductor, and control switch means for decreasing the electrical current in said conductor in response to the output signal from aid comparator.

2. An apparatus as set forth in claim 1 wherein said comparator includes first switch means which is connected with said transient voltage responsive means and is operable between a conducting condition and a nonconducting condition, said first switch means being in a conducting condition when the rate of change of voltage in said conductor is less than the predetermined rate of change, said first switch means being operated to the nonconducting condition in response to an output voltage from said transient voltage responsive means when the rate of change of voltage in said conductor exceeds the predetermined rate of change, said comparator means further including second switch means which is connected with said control switch means and is operable between a conducting condition and a nonconducting condition, said second switch means being in a nonconducting condition when said first switch means is in the conducting condition, said second switch means being in the conducting condition when said first switch means is in the nonconducting condition, said control switch means being operable from a nonconducting condition to a conducting condition in response to said second switch means changing from the nonconducting condition to the conducting condition.

3. An apparatus as set forth in claim 2 wherein said control switch means shunts electrical current from the electrical device while enabling current to flow through said conductor to said load when said control switch means is effective to decrease the electrical current in said conductor.

* * * * *